MOLECULAR COMPLEXES OF A BIS-(5-NITRO-FURFURYLIDENE)-ACETONEGUANYLHYDRAZONE COMPOUND AND AN AMINE

Jacobus Nooi, Baarn, Netherlands, assignor to Heterochemical Corporation, Valley Stream, N.Y.
No Drawing. Filed Nov. 6, 1970, Ser. No. 87,632
Int. Cl. C07d 5/30, 51/38
U.S. Cl. 260—240 A      5 Claims

ABSTRACT OF THE DISCLOSURE

Novel molecular complexes of a bis-(5-nitrofurfurylidene)-acetoneguanylhydrazone compound and an amine and feed additive premixes and feed compositions containing these complexes.

---

This invention relates to novel molecular complexes. More specifically, the present invention relates to novel and useful molecular complexes comprising a bis-(5-nitrofurfurylidene)-acetoneguanylhydrazone and acid addition salts thereof and an amine and to feed additive premixes and feed compositions containing them.

The novel molecular complexes of the present invention are utilized as animal feed additives and as such are highly desirable. Numerous additives have been utilized in animal feed compositions in an attempt to accelerate the growth of young domestic animals, e.g. cattle, swine, sheep, chickens, turkeys, ducklings and the like. A rapid growth rate in domestic animals is of great economic importance because the more rapid the growth the greater the proportion of feed which is transformed into meat. Animal feed additives are also utilized to afford protection against certain infectious diseases. The molecular complexes of the present invention exhibit a surprisingly high activity when utilized to promote growth and anti-infection properties in animal feed compositions.

Bis-(5-nitrofurfurylidene)-acetoneguanylhydrazone and its addition salts have been utilized as animal feed additives as disclosed in U.S. Pat. No. 3,264,112. Applicant is, however, unaware of any prior art which discloses the molecular complexes of the present invention or their surprisingly high activity in promoting growth and anti-infection properties.

It is, therefore, an object of the present invention to provide novel animal feed additives.

It is a further object to provide molecular complexes of a bis-(5-nitrofurfurylidene) - acetoneguanylhydrazone and acid addition salts thereof and an amine.

These and other objects of the present invention will be readily apparent to one skilled in the art upon the reading of the description of the invention which follows.

These objects are achieved by reacting a bis-(5-nitrofurfurylidene)-acetoneguanylhydrazone compound of the formula

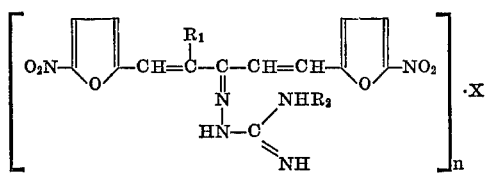

or of the formula

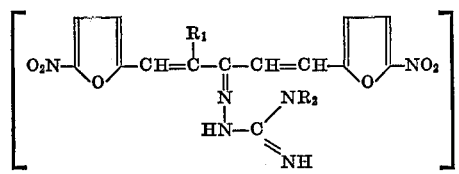

wherein $R_1$ is hydrogen, lower alkyl or halogen, $R_2$ is hydrogen or lower alkyl and X is a mono-, di- or tribasic acid, $n$ is 1, 2 or 3 with the proviso that when X is monobasic $n$ is 1, when X is dibasic $n$ is 1 or 2, and when X is tribasic $n$ is 1, 2 or 3; with a suitable amine to form the desired molecular complex. A preferred bis-(5-nitrofurfurylidene)-acetoneguanylhydrazone acid addition salt is the hydrochloride commercially available under the name "Nitrovin" from the American Cyanamid Company. A preferred bis-(5-nitrofurfurylidene) - acetoneguanylhydrazone is the compound in which $R_1$ and $R_2$ are both hydrogen.

Suitable amines which can be utilized include primary, secondary and tertiary amines and these may be aliphatic, aromatic or heterocyclic. They may be mono-, di-, tri- or polyamines. Specific amines which can be utilized in the present invention include phenylene diamine; piperazine; hydroxyethyl piperazine; N-alkyl piperazines, e.g., N-methyl, N-ethyl, N-propyl, N-butyl, N-cetyl and N-lauryl; N-(aryl substituted) alkyl piperazines, e.g. N-benzyl piperazine; guanidine; aminoethyl piperazine; p-aminobenzoic acid; nicotinic acid; picolinic acid; nicotinic acid amide; pyrrolidine; triethylamine; methyl aniline, 2-hydroxy, 2-hydroxy - 4,6 - dimethylpyrimidine; n-hexyl-amine; α-picoline; pyrrole; amino-cyclohexane; glycine; lysine; and the like. A preferred amine is 2-hydroxy-4,6-dimethylpyrimidine.

A preferred method of preparing the molecular complexes of the present invention comprises dissolving the amine in a suitable solvent, e.g., methanol, and then adding the bis-(5-nitrofurfurylidene)-acetoneguanylhydrazone or an acid addition salt thereof. The resulting mixture is stirred at room temperature for about sixteen hours and the resulting product is then filtered, e.g. by suction, washed and dried to yield the desired molecular complex.

The molecular complex compounds of this invention may be utilized alone or in admixture with suitable carriers. The may be utilized with either acid or alkaline carriers because of their extreme stability. Numerous carriers are available and one is normally selected on the basis of cost, inertness to the molecular complex and tolerance by the particular animal. The following list contains but a few of the nutritive materials which have been or may be employed as carriers: corn meal, corn cob meal, milo, soybean oil meal, alfalfa meal, dried whey, wheat shorts, distillers' dried solubles, salt, meat scarps, calcite, feather meal, poultry by-products wheat middlings, dextrose, lactose meal, dried kelp, linseed oil meal, oatmeal, dried yeast, wheat bran, soybean meal and the like.

The compounds of this invention may be provided as premixes or as concentrated mixtures which may then be used to prepare the complete feed mixture. The premix is usually prepared to contain 4 grams of the molecular complex per pound, however, multiple strength premixes, e.g., those containing 8, 12, 16, 24, 32 and 64 grams of the molecular complex per pound, can also be prepared and utilized. The premix can then be combined with other ingredients to form a complete feed, e.g., about one-quarter pound of premix with about one ton of other ingredients will form a complete chicken feed. Complete feeds for other animals can be similarly formulated. A complete feed composition can also be directly prepared containing from about 1 gram to about 20 grams of the desired molecular complex per ton of composition without utilizing the premix composition.

The following examples will illustrate in detail the manner in which the invention may be practiced. It will be understood, however, that the invention is not confined to the specific limitations set forth in the examples, but rather to the scope of the appended claims.

EXAMPLE I 1.98 g. (0.016 mole) of 2-hydroxy-4,6-dimethylpyrimidine were dissolved in 10 ml. of methanol and with continuous stirring 3.97 g. (0.01 mole) of "Nitrovin" were slowly added in small portions. The resulting mixture was stirred at room temperature for a period of 16 hours and then filtered by suction on a glass-sintered filter. The filtered product was then washed with a small amount of methanol and dried at about 40° C. yielding 4.85 g. of an orange-brown powder. Analysis of the product confirmed the structure to be the desired molecular complex.

EXAMPLE II 1.98 g. (0.016 mole) of 2-hydroxy-4,6-dimethyl-pyrimidine were dissolved in 10 ml. of methanol and with continuous stirring 3.61 g. (0.01 mole) of bis-(5-nitrofurfurylidene)-acetoneguanylhydrazone were slowly added in small portions. The resulting mixture was stirred at room temperature for a period of 16 hours and then filtered by suction on a glass-sintered filter. The filtered product was then washed with a small amount of methanol and dried at about 40° C. yielding 4.40 g. of a purple-black powder. Analysis of the product confirmed the structure to be the desired molecular complex.

EXAMPLE III

A feed premix composition is prepared by intermixing the components shown below.

soybean meal—2.2 lbs.
choline chloride—13.2 lbs.
nicotinic acid—500 g.
calcium pantothenate—200 g.
thiamin—40 g.
riboflavin—100 g.
γ-tocopherol acetate—120 g.
molecular complex of Example I—40 g.

A substantially similar feed premix composition is prepared when the molecular complex of Example II is substituted on an equal weight basis for the molecular complex of Example I in the above composition.

EXAMPLE IV

A poultry feed composition is prepared by intermixing the components shown below.

yellow corn meal—1200 lbs.
soybean meal—700 lbs.
bone meal—50 lbs.
limestone flour—30 lbs.
iodized salt—20 lbs.
manganese sulfate—0.06 lb.
cod liver oil concentrate—0.4 lb.
sulfaquinoxaline—0.30 lb.
riboflavin—3 g.
molecular complex of Example I—1 g.

A substantially similar poultry feed composition is prepared when the molecular complex of Example II is substituted on an equal weight basis for the molecular complex of Example I in the above composition.

In addition to the preferred embodiments described herein, other arrangements and variations within the spirit and scope of the invention and the appended claims will occur to those skilled in the art.

What is claimed is:
1. A molecular complex consisting essentially of
(A) a bis - (5 - nitrofurfurylidene)-acetoneguanylhydrazone compound selected from the group consisting of

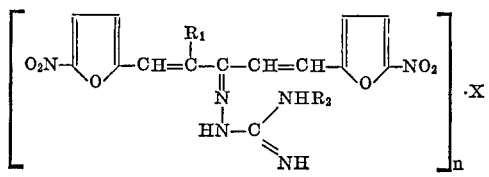

and

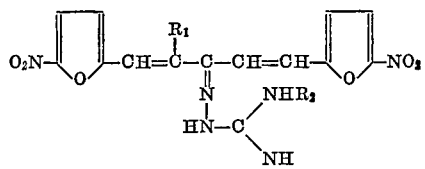

wherein $R_1$ is selected from the group consisting of hydrogen lower alkyl and halogen, $R_2$ is selected from the group consisting of hydrogen and lower alkyl, X is selected from the group consisting of a mono-, di-, and tribasic acid and $n$ is an integer selected from the group consisting of 1, 2, and 3 with the proviso that when X is monobasic $n$ is 1, when X is diabasic $n$ is 1 or 2 and when X is tribasic $n$ is 1, 2 or 3, and
(B) an amine selected from the group consisting of phenylene diamine, piperazine, hydroxyethyl piperazine, N - alkylpiperazine, N - (aryl - substituted) alkyl piperazine, guanidine, aminoethylpiperazine, p-aminobenzoic acid, nicotinic acid, picolinic acid, nicotinic acid amide, pyrrolidine, triethylamine, methylaniline, 2 - hydroxy - 4,6 - dimethylpyrimidine, n - hexylamine, α-picoline, pyrrole, aminocyclohexane, glycine, and lysine.

2. The molecular complex of claim 1 wherein the bis-(5-nitrofurfurylidene)-acetoneguanylhydrazone compound is of the formula

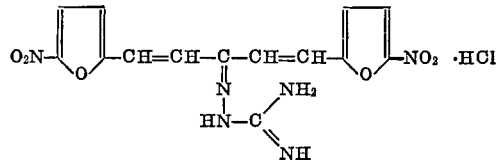

3. The molecular complex of claim 1 wherein the bis-(5-nitrofurfurylidene)-acetoneguanylhydrazone compound is of the formula

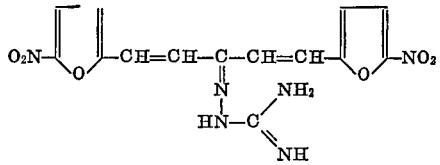

4. The molecular complex of claim 2 wherein the amine is 2-hydroxy-4,6-dimethylpyrimidine.
5. The molecular complex of claim 3 wherein the amine is 2-hydroxy-4,6-dimethylpyrimidine.

References Cited

UNITED STATES PATENTS 3,264,112   8/1966   Kodama et al. _____ 260—240 AX

OTHER REFERENCES

Chemical Abstracts, vols. 56–65, Seventh Collective Index, Subjects Flu-HW, pp. 10,532s and 10,533s (1969).
Bories, J. Chromatogr., vol. 59, pp. 467–471 (1971).

JOHN D. RANDOLPH, Primary Examiner

U.S. Cl. X.R.

99—2 G; 424—251, 285